US012808216B1

(12) United States Patent
Cao

(10) Patent No.: US 12,808,216 B1
(45) Date of Patent: Nov. 24, 2026

(54) FLOATING SWIMMING POOL WATER TREATMENT CHEMICAL DISPENSER

(71) Applicant: Chenzhou Woka E-Commerce Co., Ltd., Chenzhou (CN)

(72) Inventor: Hangming Cao, Chenzhou (CN)

(73) Assignee: Chenzhou Woka E-Commerce Co., Ltd., Chenzhou (CN)

( * ) Notice: Subject to any disclaimer, the term of this patent is extended or adjusted under 35 U.S.C. 154(b) by 2 days.

(21) Appl. No.: 19/638,122

(22) Filed: Apr. 3, 2026

(30) Foreign Application Priority Data

Mar. 16, 2026 (CN) ........................ 202620323524.2

(51) Int. Cl.

| | |
|---|---|
| ***E04H 4/12*** | (2006.01) |
| ***C02F 1/28*** | (2023.01) |
| ***C02F 1/42*** | (2023.01) |
| ***C02F 1/50*** | (2023.01) |
| ***C02F 1/52*** | (2023.01) |
| ***C02F 1/66*** | (2023.01) |
| ***C02F 1/68*** | (2023.01) |
| ***C02F 103/42*** | (2006.01) |

(52) U.S. Cl.

CPC ........... *E04H 4/1281* (2013.01); *C02F 1/281* (2013.01); *C02F 1/42* (2013.01); *C02F 1/50* (2013.01); *C02F 1/52* (2013.01); *C02F 1/66* (2013.01); *C02F 1/685* (2013.01); *C02F 2103/42* (2013.01); *C02F 2303/04* (2013.01)

(58) Field of Classification Search

None

See application file for complete search history.

(56) References Cited

U.S. PATENT DOCUMENTS

| | | | | | |
|---|---|---|---|---|---|
| 429,384 | A * | 6/1890 | Manwaring | C02F 1/42 | 206/0.5 |
| 991,825 | A * | 5/1911 | Bogie | E03D 9/038 | 210/198.1 |
| 2,826,484 | A * | 3/1958 | Buehler | B01F 21/22 | 206/0.5 |
| 2,934,409 | A * | 4/1960 | Biehl | B01J 4/001 | 4/488 |
| 2,950,959 | A * | 8/1960 | Ve Relle | B01J 4/001 | 4/232 |
| 2,976,129 | A * | 3/1961 | Buehler | C02F 1/688 | 206/0.5 |

(Continued)

FOREIGN PATENT DOCUMENTS

CN 212269492 U * 1/2021

*Primary Examiner* — Robert J Popovics

(74) *Attorney, Agent, or Firm* — All West Law Group, PLLC; Aaron Powell

(57) ABSTRACT

A medicine dispenser includes a housing; the housing is provided with a medicine placement chamber and an adsorption module placement chamber; both the medicine placement chamber and the adsorption module placement chamber are provided with a plurality of through-holes in communication with an external environment; the adsorption module placement chamber is also provided with a flotation assembly; a density of the flotation assembly is lower than that of water; the medicine dispenser not only inhibits the growth of algae, but also leaches away nutrient salts remaining in the water to cut off any nutrition source of the algae, thereby maintaining a clean water condition and hygienic water quality.

12 Claims, 7 Drawing Sheets

(56) References Cited

U.S. PATENT DOCUMENTS

| | | | | | | |
|---|---|---|---|---|---|---|
| 3,130,124 | A | * | 4/1964 | Ferris | C09D 5/16 | 210/764 |
| 3,390,695 | A | * | 7/1968 | Van Beuren | B01F 21/22 | 137/268 |
| 3,423,182 | A | * | 1/1969 | Klasky | E03D 9/038 | 222/424.5 |
| 3,426,901 | A | * | 2/1969 | Sherper | B01F 21/22 | 422/282 |
| 3,483,989 | A | * | 12/1969 | Gopstein | C02F 1/688 | 206/0.5 |
| 3,598,536 | A | * | 8/1971 | Christensen | B01F 21/22 | 4/488 |
| 3,607,103 | A | * | 9/1971 | Kiefer | C02F 1/688 | 206/0.5 |
| D223,337 | S | * | 4/1972 | Kuchar | D18/43 | |
| D224,401 | S | * | 7/1972 | Clinton | D23/207 | |
| 3,677,711 | A | * | 7/1972 | Bond | C02F 1/688 | 239/57 |
| 3,684,460 | A | * | 8/1972 | Arneson | B01F 21/22 | 210/242.1 |
| 3,754,871 | A | * | 8/1973 | Hessel | B01F 21/22 | 206/0.5 |
| 3,758,276 | A | * | 9/1973 | Bond et al. | E04H 4/1681 | 422/310 |
| 3,792,979 | A | * | 2/1974 | Clinton | B01F 21/22 | 206/0.5 |
| 3,837,017 | A | * | 9/1974 | McDuffee | E03D 9/038 | 4/DIG. 10 |
| 3,839,202 | A | * | 10/1974 | Roy | C02F 1/688 | 210/732 |
| 3,846,078 | A | * | 11/1974 | Brett | C02F 1/688 | 422/106 |
| 3,851,648 | A | * | 12/1974 | Brooke | A61K 9/2072 | 239/57 |
| 3,867,101 | A | * | 2/1975 | Herring | E03D 9/038 | 422/119 |
| 3,899,425 | A | * | 8/1975 | Lewis | B01F 21/22 | 210/438 |
| 3,924,622 | A | * | 12/1975 | Brooke | A61K 9/0004 | 239/57 |
| D238,363 | S | * | 1/1976 | Polens | D23/207 | |
| 3,933,169 | A | * | 1/1976 | Halley | E03C 1/046 | 137/268 |
| 3,937,399 | A | * | 2/1976 | Halley | C02F 1/688 | 137/268 |
| 4,040,515 | A | * | 8/1977 | Hessel | B01L 3/505 | 206/0.5 |
| D252,337 | S | * | 7/1979 | Hehnen | D23/207 | |
| 4,217,331 | A | * | 8/1980 | Schaub | B01D 11/00 | D23/207 |
| 4,218,843 | A | * | 8/1980 | Clarke, Jr. | A01M 1/2055 | 43/44.99 |
| 4,241,025 | A | * | 12/1980 | Grayson, IV | C02F 1/688 | 422/264 |
| 4,277,853 | A | * | 7/1981 | McDuffee | E03D 9/038 | 215/303 |
| 4,318,891 | A | * | 3/1982 | Kim | C02F 1/688 | 4/227.7 |
| 4,349,493 | A | * | 9/1982 | Casberg | C01B 11/068 | 264/117 |
| 4,350,666 | A | * | 9/1982 | Klutts | B01F 21/22 | 4/DIG. 10 |
| 4,363,728 | A | * | 12/1982 | Guglielmi | C02F 1/686 | 210/205 |
| 4,365,362 | A | * | 12/1982 | Corey | E03D 9/038 | 4/227.1 |
| D269,801 | S | * | 7/1983 | Sangster | D23/207 | |
| D269,802 | S | * | 7/1983 | Alexander | D23/207 | |
| 4,416,854 | A | * | 11/1983 | Nielsen | A01N 2300/00 | 210/764 |
| 4,420,394 | A | * | 12/1983 | Lewis | C02F 1/688 | 210/418 |
| D273,033 | S | * | 3/1984 | Sangster | D23/207 | |
| 4,435,858 | A | * | 3/1984 | Dolan | E03D 9/038 | 4/227.6 |
| D275,311 | S | * | 8/1984 | Wolfe | D11/158 | |
| 4,473,533 | A | * | 9/1984 | Davey | B01F 21/22 | D23/207 |
| 4,546,503 | A | * | 10/1985 | Casberg | C02F 1/688 | 422/279 |
| D282,196 | S | * | 1/1986 | Jost | D23/207 | |
| D283,649 | S | * | 4/1986 | Casberg | D23/207 | |
| 4,584,106 | A | * | 4/1986 | Held | B01F 21/22 | 422/244 |
| 4,606,893 | A | * | 8/1986 | Sangster | B01F 21/22 | 222/23 |
| D286,560 | S | * | 11/1986 | Wolfe | D23/207 | |
| 4,630,634 | A | * | 12/1986 | Sasaki | C02F 1/688 | D23/207 |
| D288,226 | S | * | 2/1987 | Sangster | D23/208 | |
| D288,227 | S | * | 2/1987 | Robinson | D23/207 | |
| 4,643,881 | A | * | 2/1987 | Alexander | C02F 1/688 | 222/548 |
| 4,702,270 | A | * | 10/1987 | King, Sr. | B01F 33/25 | 137/268 |
| 4,707,263 | A | * | 11/1987 | Nishimori | C02F 1/002 | 210/282 |
| 4,722,460 | A | * | 2/1988 | Madsen | C02F 1/50 | 222/174 |
| 4,763,685 | A | * | 8/1988 | King, Sr. | B01F 21/22 | 137/268 |
| D297,857 | S | * | 9/1988 | Alexander | D23/207 | |
| 4,775,485 | A | * | 10/1988 | Etani | C02F 1/003 | 210/764 |
| 4,798,707 | A | * | 1/1989 | Thomas | C02F 1/688 | 222/169 |
| 4,810,385 | A | * | 3/1989 | Hater | C02F 3/348 | 210/615 |
| 4,816,177 | A | * | 3/1989 | Nelson | C02F 1/688 | 252/388 |
| 4,817,214 | A | * | 4/1989 | Stuessy | C02F 1/688 | 4/496 |
| 4,822,571 | A | * | 4/1989 | Nicholson | C02F 1/688 | 422/279 |
| 4,822,579 | A | * | 4/1989 | Wagner | C02F 5/00 | 422/265 |
| 4,825,528 | A | * | 5/1989 | Nicholson | C02F 1/688 | 29/463 |
| 4,828,803 | A | * | 5/1989 | Nicholson | C02F 1/688 | 422/279 |
| 4,828,804 | A | * | 5/1989 | Nicholson | B01F 21/22 | 441/24 |
| 4,828,805 | A | * | 5/1989 | Connors | B01F 21/22 | 206/217 |
| 4,853,131 | A | * | 8/1989 | Etani | B01F 21/22 | 210/764 |
| 4,876,003 | A | * | 10/1989 | Casberg | B01F 21/00 | 206/5 |
| 4,880,547 | A | * | 11/1989 | Etani | C02F 1/688 | 210/764 |
| 4,917,868 | A | * | 4/1990 | Alexander | B01F 21/22 | 422/119 |
| 4,928,813 | A | * | 5/1990 | Casberg | C02F 1/688 | 53/442 |
| D309,493 | S | * | 7/1990 | Casberg | D23/208 | |
| 5,011,602 | A | * | 4/1991 | Totani | C02F 1/50 | 210/242.1 |
| 5,053,205 | A | * | 10/1991 | Taylor | C02F 1/688 | 210/205 |
| 5,055,183 | A | * | 10/1991 | Buchan | C02F 1/688 | 210/85 |
| 5,059,316 | A | * | 10/1991 | Renton | B01F 21/22 | 210/242.1 |
| 5,064,624 | A | * | 11/1991 | King | E04H 4/1281 | 239/57 |
| 5,076,315 | A | * | 12/1991 | King | C02F 1/688 | 422/282 |
| D325,619 | S | * | 4/1992 | Casberg | D23/207 | |

(56) References Cited

U.S. PATENT DOCUMENTS 5,124,032 A * 6/1992 Newhard ................ C02F 1/688 210/206
D328,332 S * 7/1992 Fink ............................ D23/208
D328,333 S * 7/1992 Casberg ....................... D23/208
5,133,381 A * 7/1992 Wood ...................... C02F 1/688 422/282
5,137,731 A * 8/1992 Casberg .................. C02F 1/688 424/76.8
5,149,354 A * 9/1992 Delaney ................. A01N 59/16 210/764
5,164,109 A * 11/1992 Wojtowicz ............. A01N 59/16 423/474
5,181,281 A * 1/1993 Jang ........................ E03D 9/038 4/227.3
D335,704 S * 5/1993 Casberg ....................... D23/207
5,234,588 A * 8/1993 Aymes .................... B01F 21/22 210/206
5,350,509 A * 9/1994 Nelson .................. E04H 4/1281 210/232
5,389,345 A * 2/1995 Renton ................... C02F 1/688 422/275
5,407,567 A * 4/1995 Newhard .............. B01F 21/221 210/205
5,433,867 A * 7/1995 Kisner .................... C02F 1/688 210/167.11
5,441,711 A * 8/1995 Drewery ............... B01F 25/316 137/268
5,476,116 A * 12/1995 Price ..................... E04H 4/1281 422/279
D371,824 S * 7/1996 Price ............................ D23/207
5,662,795 A * 9/1997 Pickens ................... B01F 21/22 137/268
5,662,796 A * 9/1997 Kerecz ................... B01D 29/15 239/315
5,702,614 A * 12/1997 Taylor ....................... C02F 1/66 210/242.1
D396,522 S * 7/1998 Erdewyk ...................... D23/207
5,779,913 A * 7/1998 Denkewicz, Jr. ....... C02F 1/688 210/764
5,792,360 A * 8/1998 Algar ...................... B01F 21/22 422/18
5,810,043 A * 9/1998 Grenier ................. C02F 1/4606 422/264
5,879,932 A * 3/1999 Van Erdewyk ........ C12M 23/38 435/307.1
5,888,386 A * 3/1999 Enright ................... C02F 1/688 210/232
5,916,533 A * 6/1999 Ruta ..................... B01F 21/221 422/268
D412,198 S * 7/1999 Bonelli ........................ D23/208
5,925,252 A * 7/1999 Cline ...................... C02F 1/688 210/170.08
5,979,300 A * 11/1999 Donovan ............. A23C 9/1226 206/0.5
6,019,893 A * 2/2000 Denkewicz, Jr. ....... C02F 1/505 210/205
6,123,842 A * 9/2000 Buchan ................... B01F 21/22 210/205
6,162,407 A * 12/2000 Pihl ....................... E04H 4/1281 422/275
6,165,358 A * 12/2000 Denkewicz, Jr. ....... C02F 1/688 210/232
6,190,547 B1 * 2/2001 King ....................... B01F 21/22 210/501
6,207,048 B1 * 3/2001 Bonelli ................... C02F 1/685 210/252
6,221,244 B1 * 4/2001 Yassin ................... E04H 4/1281 210/205
6,238,553 B1 * 5/2001 Lin ......................... B01F 21/22 210/85
6,248,234 B1 * 6/2001 Cline ........................ C02F 3/34 210/206
D451,978 S * 12/2001 Hood ........................... D23/208
D451,979 S * 12/2001 VanErdewyk ............... D23/208
6,379,561 B1 * 4/2002 Reidies ..................... C02F 1/72 252/175
D461,871 S * 8/2002 Flowers ....................... D21/597
6,432,371 B1 * 8/2002 Oliver, Jr. ................. C02F 1/76 210/242.1
6,500,334 B1 * 12/2002 King ..................... B01F 25/312 422/243
6,503,467 B1 * 1/2003 Robinson, Sr. ........ A01K 63/04 137/268
6,511,605 B2 * 1/2003 Connelly, Jr. ........... C02F 1/688 210/205
6,562,242 B2 * 5/2003 King ..................... B01F 25/316 210/764
6,582,668 B2 * 6/2003 Green ..................... C02F 1/688 4/227.1
6,641,787 B1 * 11/2003 Siggins ................. E04H 4/1281 210/242.1
6,676,908 B2 * 1/2004 Robinson, Sr. ........ A01K 63/04 137/268
D486,881 S * 2/2004 Pecci ........................... D23/207
6,685,827 B2 * 2/2004 King ..................... B01F 25/316 210/220
6,730,509 B2 * 5/2004 VanErdewyk ......... C12M 23/20 435/297.1
6,749,748 B1 * 6/2004 Macpherson ............. C02F 1/56 210/199
6,780,293 B2 * 8/2004 Munk ................... C02F 1/4674 204/230.6
6,790,353 B2 * 9/2004 Connelly, Jr. ......... E04H 4/1272 210/205
6,792,956 B2 * 9/2004 Bredo .................. E04H 4/1654 134/44
6,821,427 B2 * 11/2004 Macpherson ............. C02F 1/56 210/730
6,852,238 B2 * 2/2005 Connelly, Jr. ............. C02F 1/76 252/187.1
6,855,300 B2 * 2/2005 Cormier .................. C02F 1/688 441/24
D506,804 S * 6/2005 Maloney ...................... D23/208
6,901,609 B2 * 6/2005 Hill ........................... A61L 9/12 422/264
6,908,551 B2 * 6/2005 King ..................... B01F 25/316 210/205
6,944,889 B2 * 9/2005 Hill ........................... A61L 9/04 422/264
D510,404 S * 10/2005 Thompson ................... D23/207
D512,481 S * 12/2005 Thompson ................... D23/208
D517,643 S * 3/2006 Thompson ................... D23/208
D518,142 S * 3/2006 Thompson ................... D23/208
7,014,780 B2 * 3/2006 King ..................... B01F 25/312 210/205
D518,554 S * 4/2006 Thompson ................... D23/208
D518,870 S * 4/2006 Thompson ................... D23/208
7,059,540 B2 * 6/2006 King ....................... B01F 21/22 239/34
7,060,190 B2 * 6/2006 King ....................... C02F 1/688 210/764
D526,043 S * 8/2006 Thompson ................... D23/208
D526,382 S * 8/2006 Thompson ................... D23/208
7,147,770 B2 * 12/2006 King ..................... E04H 4/1272 210/232
7,238,280 B1 * 7/2007 King ....................... C02F 1/688 210/205
7,309,444 B2 * 12/2007 Connelly, Jr. ............. C02F 1/76 210/753
D559,943 S * 1/2008 Mercer ........................ D23/207
7,329,345 B2 * 2/2008 King ....................... B01F 21/22 222/129
7,347,935 B2 * 3/2008 King ..................... B01F 25/312 422/282
7,487,790 B2 * 2/2009 King ..................... E04H 4/1281 137/268
7,497,947 B2 * 3/2009 Knighton .................. C02F 3/10 210/242.1

(56) References Cited

U.S. PATENT DOCUMENTS 7,507,331 B2 * 3/2009 King ........ B01F 21/22 137/268
7,510,651 B1 * 3/2009 Auger ........ C02F 1/688 210/242.1
D592,273 S * 5/2009 Eisch ........ D23/207
D596,271 S * 7/2009 Felix ........ D23/259
7,704,467 B2 * 4/2010 Hodgetts ........ C02F 1/688 137/268
7,725,971 B2 * 6/2010 Harmer ........ B08B 9/087 134/201
D629,486 S * 12/2010 Rossano ........ D23/208
D630,705 S * 1/2011 Rossano ........ D23/208
7,883,623 B2 * 2/2011 King ........ B01F 21/22 239/57
7,922,982 B1 * 4/2011 Brennan ........ B01F 21/22 210/242.1
8,007,664 B2 * 8/2011 Reed ........ C02F 1/008 116/281
D652,374 S * 1/2012 Mercer ........ D13/102
8,168,065 B1 * 5/2012 Gavigan ........ C02F 1/76 210/167.11
8,545,697 B2 * 10/2013 Thorgersen ........ C12N 1/20 210/170.03
8,585,967 B2 * 11/2013 Snetting ........ C02F 1/76 422/32
8,617,481 B1 * 12/2013 Snetting ........ C02F 1/76 422/265
8,728,406 B2 * 5/2014 Van Der Meijden ........ B01F 21/221 210/242.1
8,999,259 B2 * 4/2015 King ........ B01F 33/503 210/167.3
9,039,903 B2 * 5/2015 King ........ C02F 1/76 210/764
9,174,177 B2 * 11/2015 King, Jr. ........ C02F 1/76
D745,947 S * 12/2015 Finley ........ D23/208
D747,439 S * 1/2016 Byers ........ D23/208
9,227,164 B2 * 1/2016 Sherman ........ B01F 21/15
9,261,302 B2 * 2/2016 Jung ........ B01F 21/15
D757,211 S * 5/2016 Slocum ........ D11/160
D784,490 S * 4/2017 Larouche ........ D23/208
9,631,388 B2 * 4/2017 Hui ........ C02F 1/4606
D788,878 S * 6/2017 Smith, Jr. ........ D23/207
9,714,129 B2 * 7/2017 Snetting ........ C02F 1/76
D794,160 S * 8/2017 Hui ........ D23/207
9,815,719 B2 * 11/2017 Sayre ........ C02F 1/688
9,850,153 B1 * 12/2017 Terry ........ B01F 21/22
9,862,626 B2 * 1/2018 King ........ E04H 4/1281
9,951,940 B2 * 4/2018 Hui ........ F21V 31/00
9,975,792 B2 * 5/2018 Thorgersen ........ C02F 1/688
9,982,451 B2 * 5/2018 McMurphy ........ A46B 11/001
10,017,402 B2 * 7/2018 King ........ C02F 1/76
10,029,931 B2 * 7/2018 King ........ C02F 1/688
10,029,932 B2 * 7/2018 King ........ B01F 21/22
D826,373 S * 8/2018 Kisner ........ D23/208
10,047,535 B2 * 8/2018 King ........ B01F 21/22
10,079,504 B2 * 9/2018 Hui ........ B63B 35/44
10,094,129 B2 * 10/2018 He ........ C02F 1/688
10,118,847 B2 * 11/2018 Howe ........ C02F 3/305
10,119,287 B2 * 11/2018 King ........ C02F 1/688
10,173,828 B2 * 1/2019 Snetting ........ B01F 21/22
10,293,310 B2 * 5/2019 Blanchette ........ B01F 23/50
10,337,200 B2 * 7/2019 King ........ E04H 4/1281
D860,387 S * 9/2019 Iyasu ........ C02F 1/50 D23/207
10,435,901 B1 * 10/2019 Smith-Taylor ........ E04H 4/1281
10,472,264 B2 * 11/2019 Simonsen ........ B01F 33/503
10,486,990 B2 * 11/2019 Epstein ........ E03F 5/06
10,618,722 B2 * 4/2020 Snetting ........ B65D 83/00
10,710,912 B1 * 7/2020 Gomez ........ C02F 1/688
10,717,055 B2 * 7/2020 Huang ........ B01J 4/001
D897,491 S * 9/2020 Moore ........ D23/208
10,843,944 B2 * 11/2020 King ........ B01F 21/22
10,875,797 B2 * 12/2020 King ........ B01F 21/22
D907,741 S * 1/2021 D'Antonio ........ D23/207
D908,186 S * 1/2021 Iyasu ........ C02F 1/50 D23/206
10,914,091 B2 * 2/2021 King ........ B01F 21/22
10,982,425 B1 * 4/2021 Grumbach ........ E03F 5/041
11,008,232 B2 * 5/2021 Waldek ........ C02F 1/46104
11,008,235 B2 * 5/2021 King ........ B01F 33/503
11,111,163 B2 * 9/2021 Carley ........ C02F 1/688
11,124,436 B2 * 9/2021 King ........ C02F 1/688
11,186,501 B2 * 11/2021 Lopez De Cardenas ........ B65D 83/06
11,242,678 B2 * 2/2022 Grumbach ........ C02F 3/342
11,408,191 B2 * 8/2022 King ........ C02F 1/688
11,447,406 B2 * 9/2022 King ........ B01F 21/22
D967,328 S * 10/2022 Speak ........ D23/208
D969,269 S * 11/2022 Tran ........ D23/208
11,492,276 B2 * 11/2022 King ........ B01F 21/22
11,493,495 B2 * 11/2022 Witelson ........ B63B 35/00
11,530,789 B2 * 12/2022 Xu ........ C02F 1/688
D980,381 S * 3/2023 Pike ........ D23/207
11,629,080 B2 * 4/2023 Guy ........ C02F 1/76 210/753
11,739,549 B2 * 8/2023 Jensen ........ E04H 4/1263 210/86
11,739,550 B2 * 8/2023 Afshar ........ C02F 1/685 210/764
D1,001,235 S * 10/2023 Foglia ........ D23/207
11,788,312 B2 * 10/2023 Shalon ........ C02F 1/685 210/85
11,814,306 B2 * 11/2023 Parker ........ C02F 1/50
11,905,190 B2 * 2/2024 Dillow ........ A47K 3/001
D1,022,119 S * 4/2024 Wan ........ D23/207
11,946,279 B2 * 4/2024 Afshar ........ B01D 29/13
12,049,768 B2 * 7/2024 Gong ........ A61L 2/08
D1,039,405 S * 8/2024 Li ........ D23/208
12,054,962 B2 * 8/2024 Guy ........ B01D 29/27
12,060,287 B2 * 8/2024 King ........ C02F 1/688
12,181,348 B1 * 12/2024 Li ........ G01K 1/14
12,234,166 B2 * 2/2025 Barton ........ C02F 1/688
12,281,490 B2 * 4/2025 Chen ........ C02F 1/4674
12,384,703 B2 * 8/2025 Gong ........ C02F 1/30
12,404,689 B2 * 9/2025 King ........ C02F 1/688
D1,114,220 S * 2/2026 Zhu ........ D23/208
12,540,087 B2 * 2/2026 Wan ........ B05B 17/08
12,595,197 B2 * 4/2026 Marchand ........ C02F 1/50
D1,126,877 S * 5/2026 Gong ........ D13/102
D1,127,698 S * 5/2026 Gong ........ D13/102
12,623,936 B2 * 5/2026 Rowhani ........ C02F 1/688
2002/0020676 A1 * 2/2002 King ........ B01F 25/312 210/753
2002/0078990 A1 * 6/2002 Munk ........ C02F 1/4674 136/291
2002/0096198 A1 * 7/2002 Bredo ........ E04H 4/1654 210/167.25
2002/0100733 A1 * 8/2002 King ........ B01F 21/22 210/753
2002/0160506 A1 * 10/2002 VanErdewyk ........ C12M 33/14 435/307.1
2002/0185455 A1 * 12/2002 Connelly, Jr. ........ C02F 1/688 210/749
2002/0197197 A1 * 12/2002 Green ........ E04H 4/1281 422/275
2003/0113245 A1 * 6/2003 Robinson, Sr. ........ A01K 63/04 422/264
2004/0040915 A1 * 3/2004 Connelly, Jr. ........ A01N 59/00 210/756
2004/0069698 A1 * 4/2004 King ........ B01F 25/312 210/205
2004/0091654 A1 * 5/2004 Kelly ........ F01P 11/06 428/35.7
2004/0108261 A1 * 6/2004 King ........ E04H 4/1281 210/198.1
2004/0144699 A1 * 7/2004 Lin ........ G05D 21/02 210/85
2004/0168963 A1 * 9/2004 King ........ B01F 21/22 210/198.1

(56) References Cited

U.S. PATENT DOCUMENTS

2004/0175311 A1* 9/2004 Cormier .................... A61L 2/23 422/40
2004/0195185 A1* 10/2004 Macpherson ............. C02F 1/56 210/729
2005/0063858 A1* 3/2005 Cormier .................... A61L 2/23 422/265
2005/0077374 A1* 4/2005 King ....................... B01F 21/22 239/42
2005/0126977 A1* 6/2005 Carter ..................... C02F 1/285 210/242.4
2005/0163684 A1* 7/2005 Sherr ...................... B01F 21/22 422/265
2005/0173353 A1* 8/2005 Connelly, Jr. ............. C02F 1/76 210/753
2005/0189276 A1* 9/2005 Palmer .................... C02F 1/688 210/167.11
2005/0211613 A1* 9/2005 King ..................... E04H 4/1272 210/167.11
2005/0242016 A1* 11/2005 King ..................... B01F 25/316 210/198.1
2005/0279677 A1* 12/2005 Lin ......................... C02F 1/688 210/85
2006/0032123 A1* 2/2006 Knighton .................. C02F 1/50 47/59 R
2006/0254968 A1* 11/2006 King ....................... C02F 1/688 210/198.1
2006/0276338 A1* 12/2006 Hodgetts ................. C02F 1/688 504/120
2007/0000037 A1* 1/2007 Wolf ......................... A61L 9/05 4/286
2007/0000831 A1* 1/2007 Kelly ...................... B01F 21/22 210/749
2007/0007211 A1* 1/2007 Sevier ..................... C23F 11/08 210/206
2007/0039859 A1* 2/2007 King ..................... E04H 4/1636 210/97
2007/0119761 A1* 5/2007 King ..................... E04H 4/1281 210/198.1
2007/0272622 A1* 11/2007 Mercer ..................... C02F 1/76 210/754
2008/0217258 A1* 9/2008 Buchan ................... B01F 21/22 210/167.11
2009/0317486 A1* 12/2009 Hodgetts ................. C02F 1/688 424/641
2010/0059421 A1* 3/2010 Reed ....................... C02F 1/688 210/86
2010/0196228 A1* 8/2010 Efird ..................... E04H 4/1281 422/265
2010/0320144 A1* 12/2010 Knighton .................. C02F 3/10 210/602
2011/0089121 A1* 4/2011 Van Der Meijden ........................ B01F 21/221 222/130
2011/0132835 A1* 6/2011 Knighton ............... A61K 36/10 210/602
2011/0132848 A1* 6/2011 Diaz ....................... B01F 21/22 210/764
2011/0163027 A1* 7/2011 Knighton ............... A01N 65/00 210/602
2011/0240757 A1* 10/2011 Selk ........................ B05B 17/08 239/18
2012/0085700 A1* 4/2012 Knighton .................. C02F 3/10 210/602
2012/0248037 A1* 10/2012 Knighton ................ C02F 3/327 210/602
2012/0255893 A1* 10/2012 Le Clair ................. B01F 21/22 210/167.11
2012/0255901 A1* 10/2012 Thorgersen .............. C12N 1/20 210/615
2012/0260997 A1* 10/2012 Snetting .................... C02F 1/76 137/3
2012/0285883 A1* 11/2012 Knighton .................. C02F 3/32 210/602
2012/0298577 A1* 11/2012 Thorgersen ............. C02F 1/688 210/608
2013/0092634 A1* 4/2013 King ....................... C02F 1/766 210/749
2013/0092635 A1* 4/2013 King ..................... E04H 4/1209 210/749
2013/0118976 A1* 5/2013 Knighton .................. C02F 3/10 210/602
2013/0126423 A1* 5/2013 Knighton ............... A61K 36/10 210/602
2013/0206660 A1* 8/2013 Hui ....................... C02F 1/4606 210/167.11
2013/0319934 A1* 12/2013 Knighton ............... A01N 65/00 210/602
2014/0008295 A1* 1/2014 Knighton ............... A61K 36/10 210/602
2014/0027358 A1* 1/2014 Sayre ...................... C02F 1/688 424/641
2014/0110352 A1* 4/2014 King ....................... C02F 1/505 222/173
2014/0124456 A1* 5/2014 King ....................... C02F 1/766 210/764
2014/0138293 A1* 5/2014 Tackett ................... C02F 1/688 210/85
2014/0166573 A1* 6/2014 Knighton ................ C02F 3/327 210/602
2014/0170036 A1* 6/2014 Sherman ................. B01F 21/15 422/256
2014/0175022 A1* 6/2014 King ....................... B01F 21/22 210/749
2014/0197183 A1* 7/2014 Snetting ................. B65D 83/00 220/660
2014/0202955 A1* 7/2014 Knighton ................ C02F 1/286 210/602
2014/0205512 A1* 7/2014 King ..................... E04H 4/1281 422/265
2015/0041391 A1* 2/2015 Knighton ............... A01N 65/03 210/602
2015/0152662 A1* 6/2015 King ......................... C02F 1/76 422/265
2015/0152663 A1* 6/2015 King ....................... C02F 1/766 210/747.1
2015/0240510 A1* 8/2015 King ..................... E04H 4/1281 210/85
2015/0266760 A1* 9/2015 Knighton ................ C02F 3/327 210/602
2015/0322683 A1* 11/2015 Edwards ............... E04H 4/1281 210/86
2015/0368128 A1* 12/2015 King ......................... C02F 1/76 422/119
2016/0039696 A1* 2/2016 Knighton .................. C02F 3/32 210/602
2016/0090318 A1* 3/2016 Knighton ............... A01K 63/04 210/602
2016/0376801 A1* 12/2016 McMurphy .......... A46B 11/001 210/747.6
2017/0267439 A1* 9/2017 Snetting .................... C02F 1/76
2017/0356209 A1* 12/2017 He .......................... C02F 1/688
2018/0029906 A1* 2/2018 King ....................... C02F 1/766
2018/0065872 A1* 3/2018 Carley .................... C02F 1/688
2018/0087285 A1* 3/2018 Craft .................... B65D 83/049
2018/0111849 A1* 4/2018 Gruber ................... B01D 24/24
2018/0133666 A1* 5/2018 Blanchette .............. B01F 25/25
2018/0209160 A1* 7/2018 King ......................... C02F 1/76
2018/0229919 A1* 8/2018 King ....................... C02F 1/688
2018/0237320 A1* 8/2018 King ....................... C02F 1/688
2018/0327291 A1* 11/2018 Simonsen ............. B01F 33/503
2019/0022603 A1* 1/2019 Huang .................... C02F 1/688
2019/0100372 A1* 4/2019 Snetting .................... C02F 1/76
2019/0257102 A1* 8/2019 King ....................... C02F 1/688
2019/0257807 A1* 8/2019 Witelson ................. B63B 35/00
2019/0322557 A1* 10/2019 King ......................... C02F 1/76
2020/0290905 A1* 9/2020 Dettorre ................ B01F 33/503
2020/0399153 A9* 12/2020 King ..................... E04H 4/1281
2021/0024384 A1* 1/2021 King ....................... C02F 1/688

(56) References Cited

U.S. PATENT DOCUMENTS

2021/0071436 A1* 3/2021 King .................... E04H 4/1281
2021/0078880 A1* 3/2021 King .................... B01F 21/22
2021/0172188 A1* 6/2021 Afshar .................. E04H 4/1281
2021/0198130 A1* 7/2021 King .................... C02F 1/76
2021/0262638 A1* 8/2021 Zhao .................... F21V 11/08
2021/0340786 A1* 11/2021 Zhang .................. G01K 1/14
2021/0371309 A1* 12/2021 Gallant ................ F21L 4/08
2022/0055922 A1* 2/2022 Mendez ................. C02F 1/281
2022/0064034 A1* 3/2022 Dillow .................. A47K 3/001
2022/0119291 A1* 4/2022 Murphy ................. E04H 4/1272
2022/0259083 A1* 8/2022 Marchand ............... C02F 1/50
2022/0282509 A1* 9/2022 Guy ..................... B01D 29/27
2022/0315458 A1* 10/2022 Buchan ................ C02F 1/50
2022/0332613 A1* 10/2022 Feniger ............... C02F 1/688
2022/0412113 A1* 12/2022 Zhang ................. C02F 1/687
2023/0079803 A1* 3/2023 Hibbs ................... C02F 1/688
210/758
2023/0101118 A1* 3/2023 Rowhani ................ C02F 1/688
210/198.1
2023/0184598 A1* 6/2023 Zhang ................... G01K 1/08
374/208
2023/0242425 A1* 8/2023 Rowhani ................ C02F 1/66
210/764
2023/0250660 A1* 8/2023 L'Hoest ................. C02F 1/688
137/268
2023/0250661 A1* 8/2023 Afshar .................. B01D 29/13
210/764
2023/0348301 A1* 11/2023 Guy .................... C02F 1/685
2023/0357060 A1* 11/2023 Barton ................. C02F 1/68
2023/0391646 A1* 12/2023 Cymbalski ............. C02F 1/688
2024/0141666 A1* 5/2024 Gong .................... A61L 2/08
2024/0142099 A1* 5/2024 Longoria ............... F21S 8/00
2024/0175280 A1* 5/2024 Barton .................. E04H 4/1245
2024/0262722 A1* 8/2024 Stevens ................. C02F 1/001
2024/0270616 A1* 8/2024 Dillow .................. C02F 1/688
2024/0392594 A1* 11/2024 Guy .................... E04H 4/1281
2025/0161887 A1* 5/2025 L'Hoest ................. B01F 21/20
2025/0171336 A1* 5/2025 Gong .................... C02F 1/30
2025/0237076 A1* 7/2025 Guy ..................... E04H 4/1272
2025/0243092 A1* 7/2025 Wan ..................... B05B 17/08
2025/0304469 A1* 10/2025 Winslow ............... C02F 1/008
2025/0388500 A1* 12/2025 Munford ............... C02F 1/686
2026/0097976 A1* 4/2026 Hanna ................... C02F 1/5236

* cited by examiner

FLOATING SWIMMING POOL WATER TREATMENT CHEMICAL DISPENSER

CROSS-REFERENCE TO RELATED APPLICATIONS

The present application claims the benefit of Chinese Patent Application No. 2026203235242 filed on Mar. 16, 2026, the contents of which are hereby incorporated by reference.

TECHNICAL FIELD

The present invention belongs to the field of water quality cleaning technology, and in particular relates to a medicine dispenser.

TECHNICAL BACKGROUND

Conventional water treatment methods for a swimming pool are mainly divided into two types: one type is regularly treating swimming pool waters with disinfectants; another type is installing medicine dispensers with disinfectants on the bottom of the swimming pool. For example, a Chinese publication number CN 212269492 U (see US 2022/0412113 A1) has disclosed a pool medication dispenser, which includes a main body and an upper cover covering an open end of the main body which is provided with a mounting cavity for medicaments like disinfectants; the pool medication dispenser further comprises a medicament amount indication member with scale numbers; a lower end of the medicament amount indication member passes downwards through the upper cover and presses on the medication; the medicament amount indication member slides down as the medicaments dissolved so as to indicate a remaining medicament amount in the main body.

The medicaments in such medication dispensers kill algae, but those residual nutrient salts still remain in the water and keep nourishing the algae; in other words, the algae grow rapidly again, resulting in repeated deterioration of water quality; people have to spend high costs to maintain water quality.

Therefore, it is necessary to invent a new device to eliminate algae and leach away nutrient salts in water at the same time, thereby inhibiting the growth of algae fundamentally.

INVENTION CONTENT

In order to overcome the shortcomings of the prior art, the present invention provides a medicine dispenser, which will not only eliminate the algae, but also leashes away nutrient salts remaining in the water to cut off the nutrient source of the algae, thereby fundamentally inhibiting the growth of the algae and maintain a clean and hygienic water quality.

The technical solution adopted by the present invention for solving the technical problem is:

A medicine dispenser, comprises a housing, which is provided with a medicine placement chamber and an adsorption module placement chamber; both the medicine placement chamber and the adsorption module placement chamber are provided with a plurality of through-holes in communication with an external environment; the adsorption module placement chamber is also provided with a flotation assembly; a density of the flotation assembly is lower than that of water.

Further, the housing comprises a first storage box and a second storage box; the first storage box detachably connects to the second storage box; the adsorption module placement chamber is arranged inside the first storage box; the medicine placement chamber is arranged inside the second storage box.

Further, the plurality of through-holes comprises a plurality of first through-holes and second through-holes; the plurality of first through-holes is arranged in the first storage box; the plurality of second through-holes is arranged in the second storage box.

Further, the second storage box comprises an outer housing and an inner housing; the medicine placement chamber is arranged in the inner housing; the outer housing is sheathed on a periphery of the inner housing; a bottom side of the outer housing is provided with a plurality of openings; the plurality of second through-holes are arranged at a bottom side of the inner housing; when a user rotates the outer housing around the inner housing to make the plurality of second through-holes exposed on the plurality of openings, waters then flow into the inner housing; or when the user rotates the outer housing around the inner housing to make the plurality of second through-holes just mismatched with the plurality of openings, water then fails to flow into the inner housing.

Further, the plurality of second through-holes is arranged on the bottom side of the inner housing at intervals; the user rotates the outer housing to control a number of the plurality of second through-holes exposed on the plurality of openings.

Further, the outer housing is provided with a gear hole and a plurality of gear identifications; the plurality of gear identifications is arranged on a side of the gear hole; the inner housing is provided with an indicator block; the indicator block slides along the gear hole; when the user rotates the outer housing around the inner housing to make the plurality of second through-holes exposed on the plurality of openings, the indicator block slides along the gear hole to indicate a number of the plurality of second through-holes exposed on the plurality of openings via the plurality of gear identifications.

Further, the medicine placement chamber is provided with a plurality of supports; the plurality of supports stack inside the medicine placement chamber in a vertical direction of the inner housing.

Further, a side wall of the inner housing is symmetrically provided with a plurality of guide rails; the plurality of guide rails extends along the vertical direction of the inner housing; each of the plurality of supports comprises a spacer and a plurality of support legs; a plurality of support legs slides along the plurality of guide rails.

Further, the first storage box comprises a base plate and a cover body; the base plate is provided with a plurality of plug blocks; the cover body is provided with a plurality of plug holes; the plurality of plug blocks is respectively matched with the plurality of plug holes.

Further, the plurality of plug blocks comprises wedge-shaped plug blocks and D-shaped plug blocks; the plurality of plug holes comprises wedge-shaped plug holes and D-shaped plug holes.

The beneficial effects of the present invention are as follows:

The present invention provides a medicine dispenser, which not only has a basic function of dispensing medicaments, but also has an adsorption function to leash away nutrient salts in the swimming pool by an adsorption module; the adsorption module leashes away nutrient salts to cut off the nutrient sources of the algae, thereby inhibiting the growth of the algae fundamentally, and maintaining the clarity and hygiene of water quality.

DESCRIPTION OF MARKS IN FIGURES

Figure 1:
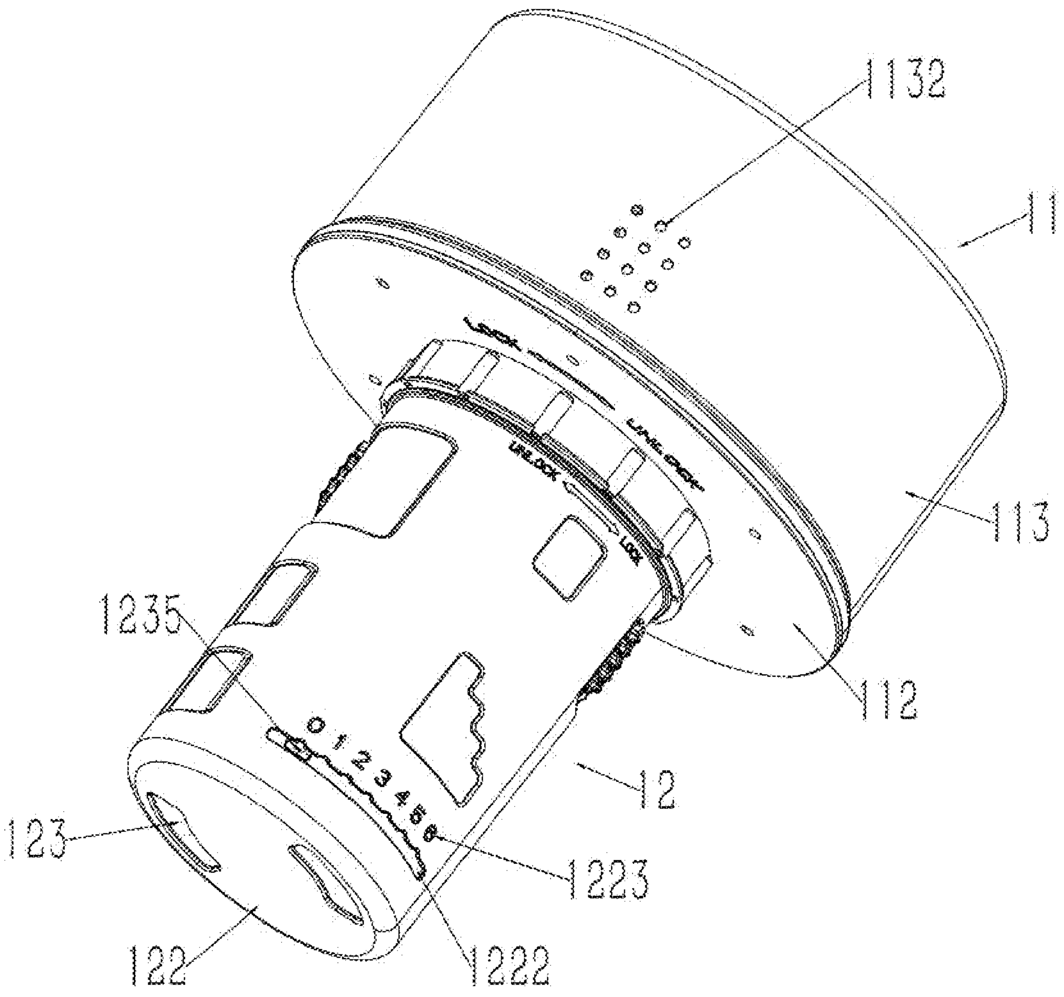
FIG. 1 is a schematic view of a medicine dispenser of the present invention.

1-housing;

11-first storage box; 110-adsorption module placement chamber; 111-flotation assembly; 112-base plate; 1121-internal thread; 1122-plug block; 113-cover body; 1131-plug hole; 1132-first through-hole;

12-second storage box; 120-medicine placement chamber; 121-support; 1211-spacer; 1212-support leg;

122-outer housing; 1221-opening; 1222-gear hole; 1223-gear identification; 1224-irregular hollow opening; 123-inner housing; 1231-second through-hole; 1232-third through-hole; 1233-guide rail; 1234-external thread; 1235-indicator block.

DETAILED DESCRIPTION OF THE EMBODIMENTS

The present embodiment only shows an explanation of the present invention, and it is not a limitation to the present invention. The skilled in the art can make modifications to this embodiment as needed without making any creative contributions after reading this specification, which are always protected by the patent law as long as they are within the scope of the claims of the present invention.

It should be noted that when an element is referred to be “fixed to” or “arranged on” another element, the element may be directly on the another element or indirectly on the another element; when an element is referred to be “connected to” another element, the element can directly connects to the other element or indirectly connects to the other element.

It should be understood that, a plurality of terms included “length”, “width”, “up”, “down”, “front”, “rear”, “left”, “right”, “vertical”, “horizontal”, “top”, “bottom”, “inner”, “outer” and so on; orientation or position relationships indicated by the terms are based on the drawings, which are only used to facilitate description of the present invention and simplify the description, rather than indicating or implying that the device or element referred to must have a specific orientation, and be constructed and operated in a specific orientation; therefore that cannot be construed as a limitation on the present invention.

In addition, terms such as “first” and “second” are used herein for purposes of description and are not intended to indicate or imply relative importance or significance or to imply the number of indicated technical features. Thus, the features defined by “first” and “second” may explicitly or implicitly include one or more of the features. In the description of some inventions, the meaning of “a plurality of” is two or more, unless specified otherwise.

The medicine dispenser of the present invention is mainly used in a swimming pool. The medicine dispenser not only has a basic function of dispensing medicaments, but also has an adsorption function to leash away nutrient salts in the swimming pool by an adsorption module; the adsorption module leashes away nutrient salts to cut off the nutrient sources of the algae, thereby inhibiting the growth of the algae fundamentally, and maintaining the clarity and hygiene of water quality.

Referring to FIGS. 1 to 8, a medicine dispenser comprises a housing 1; the housing 1 is further provided with a medicine placement chamber 120 and an adsorption module placement chamber 110; both the medicine placement chamber 120 and the adsorption module placement chamber 110 are provided with a plurality of through-holes in communication with an external environment; the adsorption module placement chamber 110 is also provided with a flotation assembly 111; a density of the flotation assembly 111 is lower than that of water.

The flotation assembly 111 is made of expandable polystyrene foam (EPS foam), ethylene-vinyl acetate copolymer foam (EVA foam), or polyethylene foam (PE foam), etc.

Users put medicaments into the medicine placement chamber 120 according to actual needs, such as sanitizers, clarifier, and specialty conditioner medicaments. Among which, the sanitizer medicaments are used to kill bacteria, viruses and algae in water so as to prevents waters being polluted and curb the spread of diseases; the clarifier medicaments are used to remove suspended substance in the water, so as to keep the water in the swimming pool clean; the specialty conditioner medicaments are used to adjust a pH range of the water, thereby improving a disinfection effect in the swimming pool.

The users can put different adsorption modules into the adsorption module placement chamber 110 according to actual needs, such as natural clay minerals, metal oxide/hydroxide, various mineral composite materials and so on. Among which, the natural clay minerals have a porous structure, which helps to absorb nutrient salts by an ion exchange method or a physical adsorption method; the metal oxide/hydroxide efficiently absorbs nutrient salts by a chemical reaction or precipitation reaction method; various mineral composite materials absorb nutrient salts by minerals chemical reaction method. In this embodiment, the adsorption module is a natural clay mineral to leash away nutrient salts in the water.

The housing 1 comprises a first storage box 11 and a second storage box 12; the first storage box 11 connects to the second storage box 12 detachably; an adsorption module placement chamber 110 is arranged inside the first storage box 11; a medicine placement chamber 120 is arranged inside the second storage box 12.

The plurality of through-holes includes a plurality of first through-holes 1132 and a plurality of second through-holes 1231; the plurality of first through-holes 1132 are arranged on the first storage box 11; the plurality of second through-holes 1231 are arranged on the second storage box 12.

When the users put the medicine dispenser into the swimming pool, waters in the swimming pool flow into the adsorption module placement chamber 110 through the plurality of first through-holes 1132; the adsorption module in the adsorption module placement chamber 110 leashes away nutrient salts in the water; then treated waters flow back to the swimming pool through the first through-holes 1132. Meanwhile, waters in the swimming pool flow into the medicine placement chamber 120 through the second through-holes 1231 and medicaments in the medicine placement chamber 120 dissolve in the water, then waters with medicaments flow back to the swimming pool through the second through-holes 1231.

Figure 2:
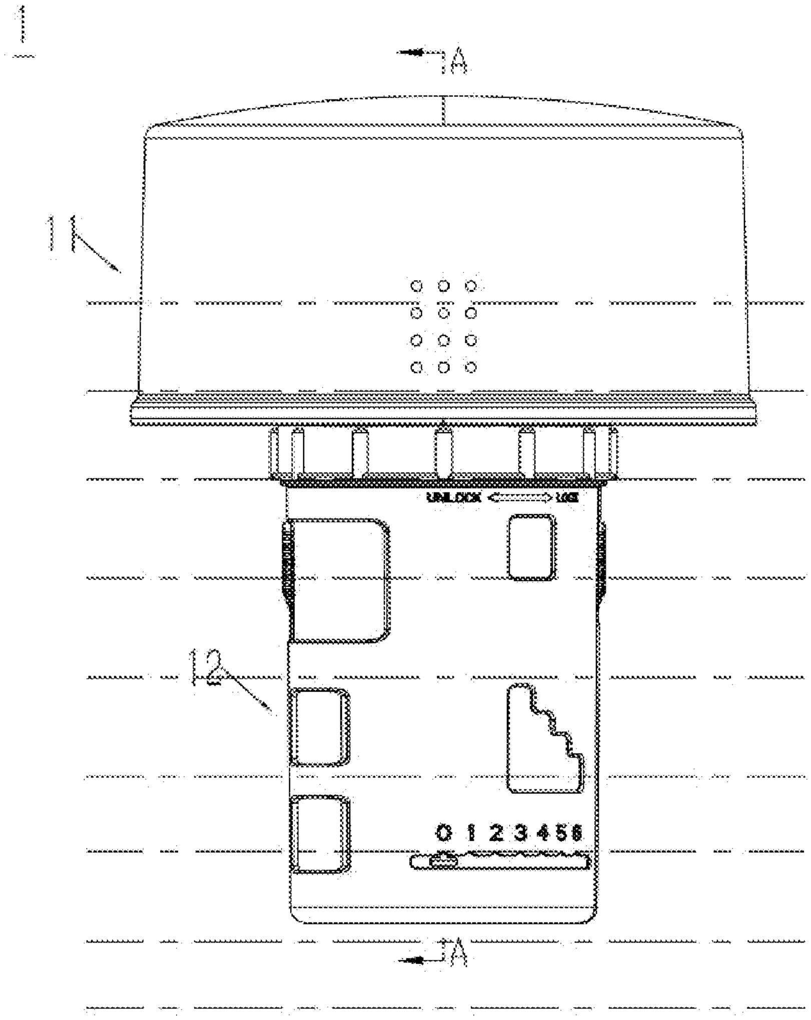
FIG. 2 is a schematic view showing the medicine dispenser used in water.
Figure 3:
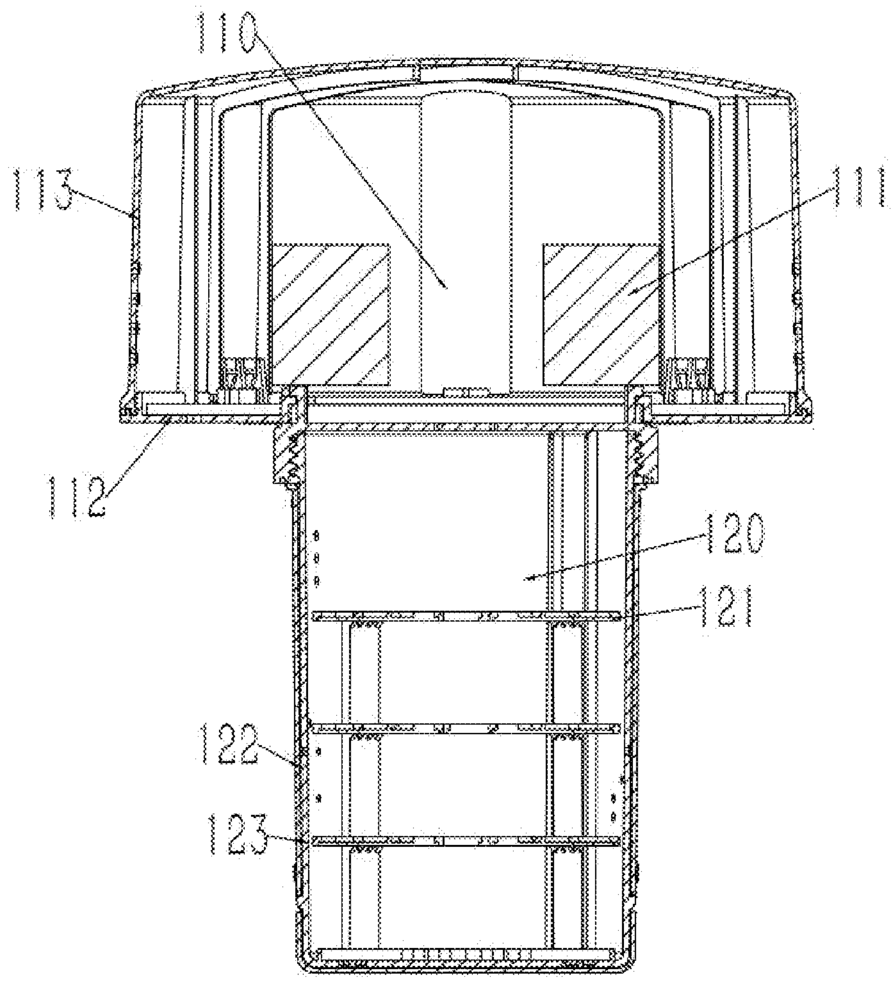
FIG. 3 is a cross-sectional view along A-A in FIG. 2.
Figure 4:
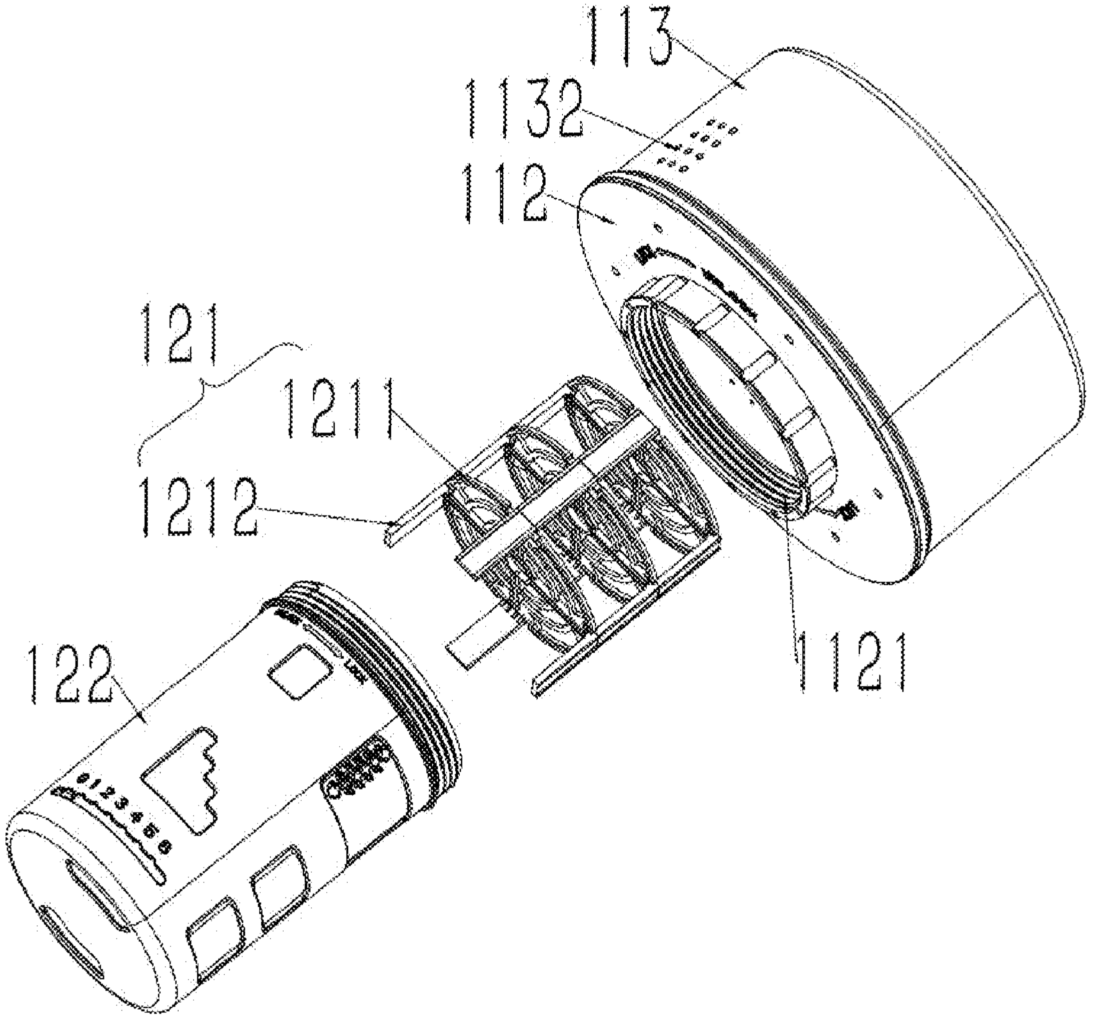
FIG. 4 is an exploded view of the medicine dispenser.
Figure 5:
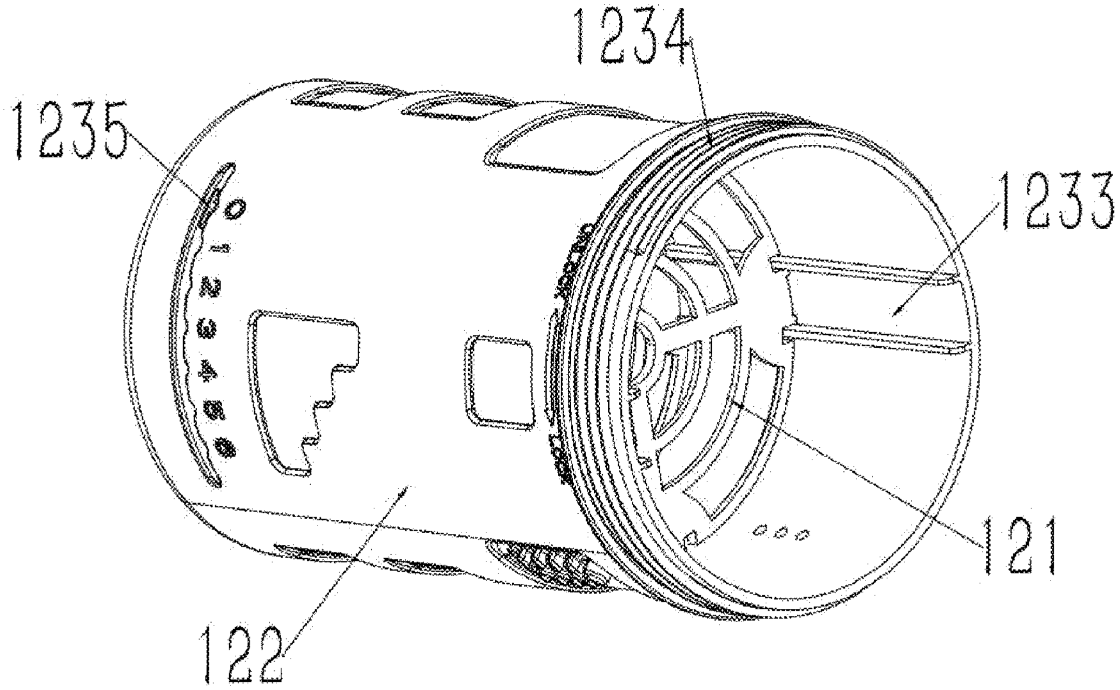
FIG. 5 is a schematic view of a second storage box.
Figure 6:
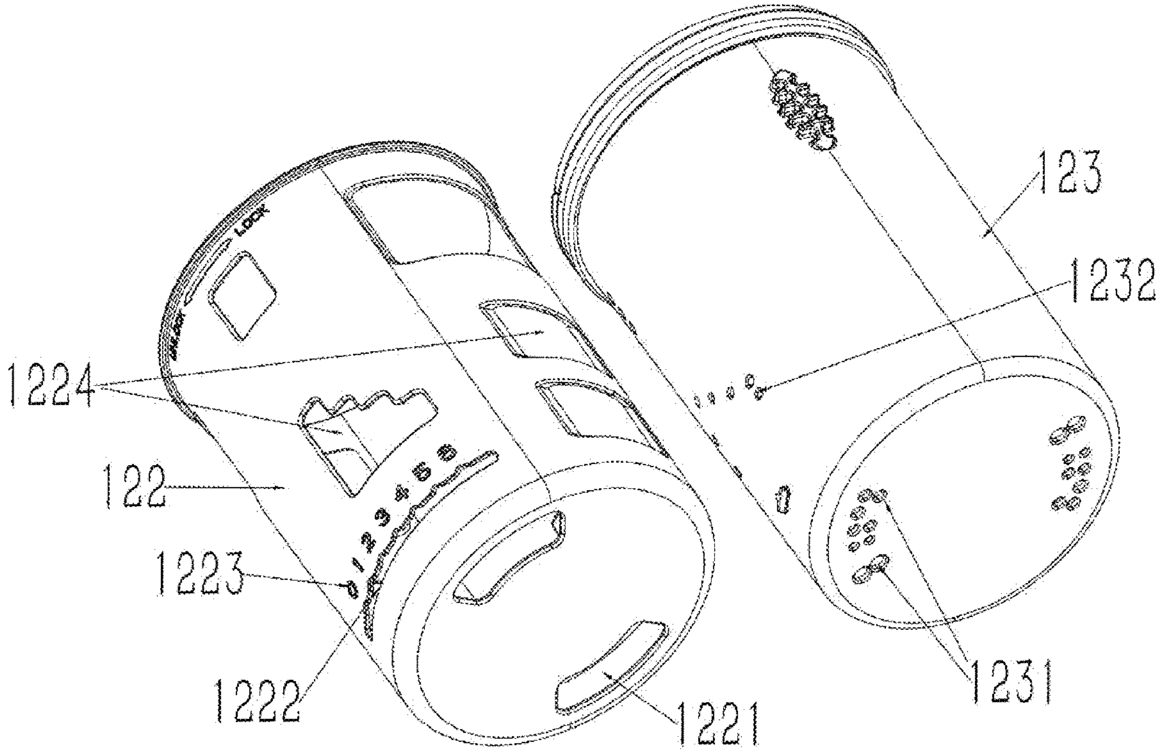
FIG. 6 is an exploded view of the second storage box.
Figure 7:
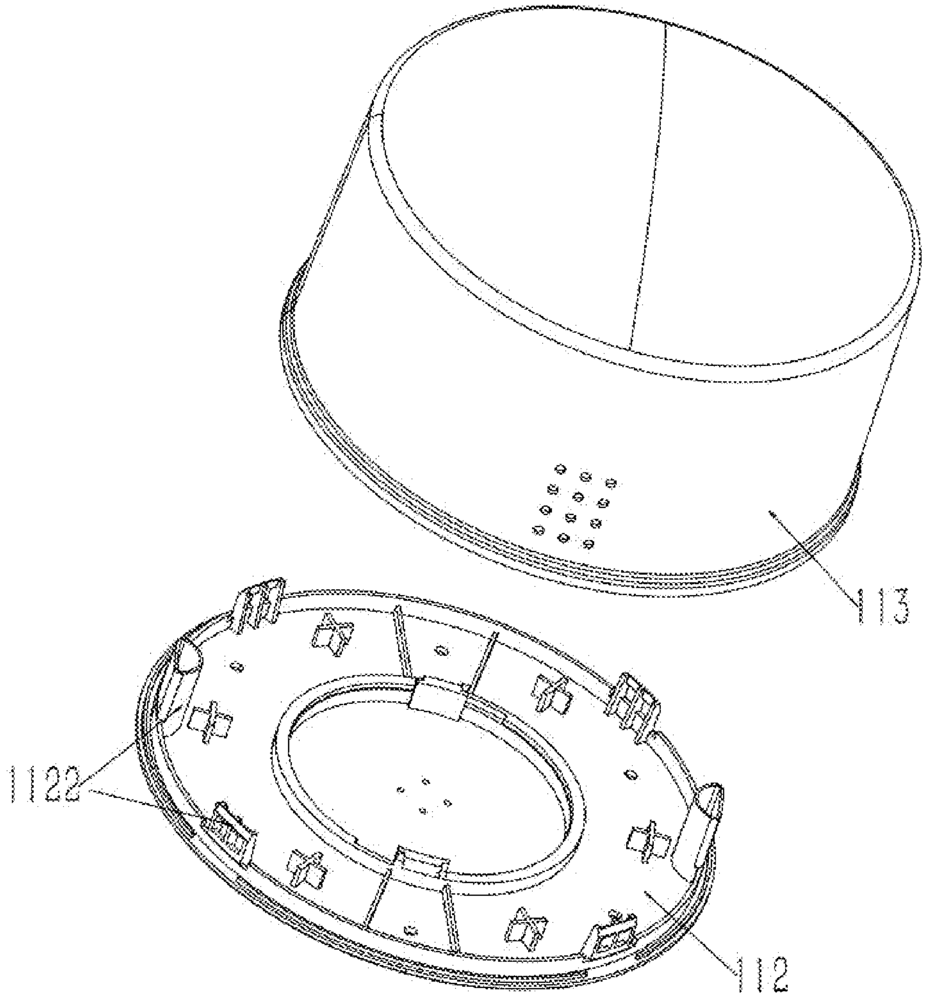
FIG. 7 is an exploded view of a first storage case.
Figure 8:
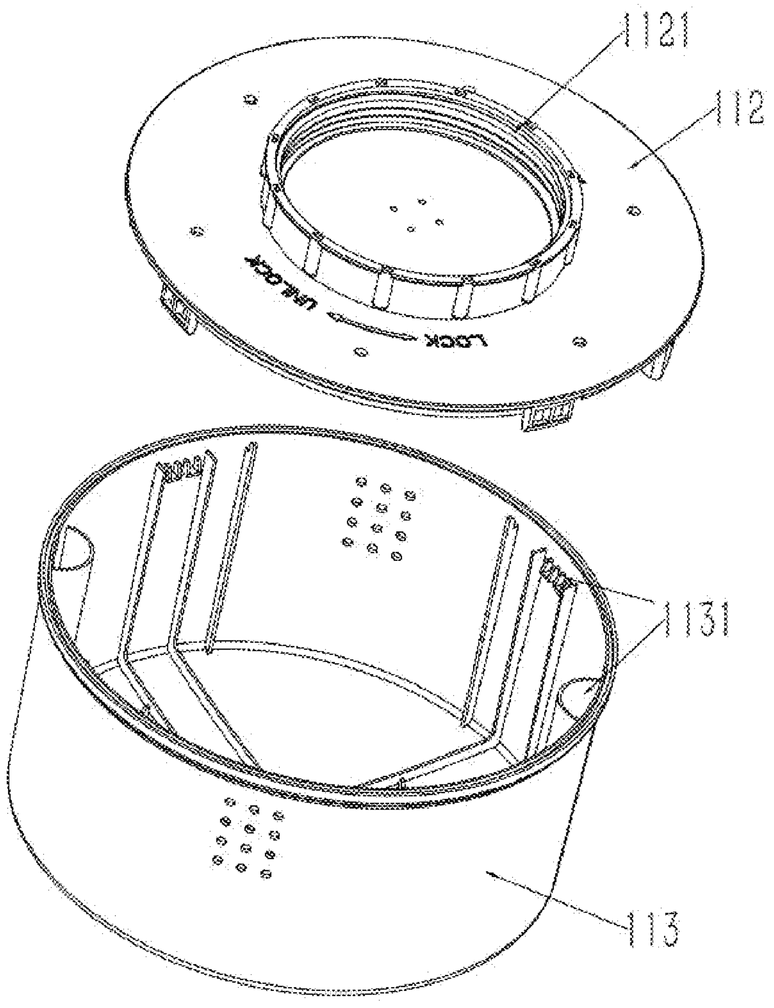
FIG. 8 is another exploded view of the first storage box.

Further, as shown in FIG. 2, the medicine dispenser is suspended in the swimming pool in use, to be specific, the second storage box 12 with medicaments sinks below the water; because of the flotation assembly 111, the first storage box 11 partially floats above the water, in other words, the first storage box 11 partially sinks under the water; the users can observe a location of the medicine dispenser via a part of the first storage box 11 above the water; in the meanwhile, waters flow into the adsorption module placement chamber 110 of the first storage box 11 via the plurality of first through-holes 1132 under the water.

The second storage box 12 comprises an outer housing 122 and an inner housing 123; the medicine placement chamber 120 is arranged inside the inner housing 123; the outer housing 122 is sleeved on an outer periphery of the inner housing 123; a plurality of openings 1221 are arranged on a bottom side of the outer housing 122; the plurality of second through-holes 1231 are arranged on a bottom side of the inner housing 123; the users can rotate the outer housing 122 to make the plurality of second through-holes 1231 exposed on the plurality of openings 1221, and then waters flows into the inner housing123 through the plurality of openings 1221 and second through-holes 1231; or the users can rotate the outer housing 122 to make the plurality of second through-holes 1231 just mismatched with the plurality of openings 1221, the waters fail to flow into the inner housing 123.

The plurality of second through-holes 1231 are arranged on the bottom side of the inner housing 123 at intervals; the users can rotate the outer housing 122 to expose different numbers of the plurality of second through-holes 1231 on the plurality of openings 1221; in this way, the users can control a flow speed and volume of water into the second storage box 12, so that the users control a dissolution rate of the medicaments inside the second storage box 12.

The outer housing 122 is provided with a gear hole 1222 and a plurality of gear identifications 1223; the plurality of gear identifications 1223 are arranged on a side of the gear hole 1222; the inner housing 123 is provided with an indicator block 1235 which slides along the gear hole 1222; when the users rotate the outer housing 122 to make the plurality of second through-holes 1231 exposed on the plurality of openings 1221, the indicator block 1235 slides along the gear hole 1222 to indicate a number of the plurality of second through-holes 1231 exposed on the plurality of openings 1221.

By designing the gear identifications 1223, the users can easily control and know a flow speed and volume of water into the second storage box 12, so as to control a dissolution rate of the medicaments; numbers of gear identifications 1223 correspond to numbers of the plurality of second through-holes 1231 exposed on the plurality of openings 1221.

As another implementation of the present invention, a side wall of the inner housing 123 is provided with a plurality of third through-holes 1232; a side wall of the outer housing 122 is provided with a plurality of irregular hollow openings 1224; when the users rotate the outer housing 122 to make the plurality of third through-holes 1232 exposed on the plurality of irregular hollow openings 1224, in this way, the users control the flow speed and volume of water into the inner housing 123 via the plurality of irregular hollow openings 1224 and third through-holes 1232, then control the dissolution rate of the medicaments.

The medicine placement chamber 120 is further provided with a plurality of supports 121; the plurality of supports 121 stacks inside the medicine placement chamber in a vertical direction of the inner housing. The plurality of supports 121 are used to separate the medicaments avoiding adhesion, and then control the dissolution rate, as well as ensure the medicaments dissolved evenly, and the medicine dispenser works stably for a long-term.

The side wall of the inner housing 123 is also symmetrically provided with a plurality of guide rails 1233, which extends along the vertical direction of the inner housing 123; each of the plurality of supports 121 includes a spacer 1211 and a plurality of support legs 1212; the plurality of support legs 1212 slide along the plurality of guide rails 1233, which guide the plurality of support legs 1212 to be installed vertically in the inner housing 123.

The bottom side of the first storage box 11 is provided with internal threads 1121; the top side of the second storage box 12 is provided with external threads 1234; the second storage box 12 is detachably connected with the first storage box 11 via the internal threads 1121 and the external threads 1234.

The first storage box 11 includes a base plate 112 and a cover body 113; the base plate 112 is provided with a plurality of plug blocks 1122; the cover body 113 is provided with a plurality of plug holes 1131; the plurality of plug blocks 1122 adapt to the plurality of plug holes 1131; the cover body 113 is installed on the base plate 112 by pushing the plurality of plug blocks 1122 into the plurality of plug holes 1131 correspondingly.

The plurality of plug blocks 1122 include wedge-shaped plug blocks 1122 and D-shaped plug blocks 1122; the plurality of plug hole 1131 includes wedge-shaped plug holes 1131 and D-shaped plug holes 1131; there is a one-to-one correspondence between the plurality of plug holes 1131 and plug blocks 1122.

It could be understood that under the guidance of the above embodiments, those skilled in the art can combine various implementation methods in the above embodiments to obtain technical solutions of multiple implementation methods.

The above description is only a preferred embodiment of the present invention and is not to limit the present invention. Any modifications, equivalent substitutions and improvements made within the spirit and principles of the present invention should be included in the scope of protection of the present invention.

The invention claimed is:

1. A swimming pool water treatment chemical dispenser comprising:

a housing (1) including:
- a first storage box (11) defining a first interior cavity, and having an internally threaded orifice (1121) at a bottom side thereof;
- a flotation assembly (111) disposed within the first interior cavity, capable of keeping the dispenser floating on a surface of the water;
- a support assembly (121) including:
  - a plurality of axially spaced supports (1211) for supporting medicaments;
  - a plurality of longitudinally extending support legs (1212) attached to, and maintaining the spacing between the plurality of axially spaced supports (1211);

a second storage box (12) defining a second interior cavity and through-holes placing the second interior cavity in fluid communication with an external environment, including:

an outer housing (122) having an externally threaded open top (1234); and an inner housing (123) receivable within the outer housing (122) and having a guide rail (1233) on an interior wall surface for slidably engaging and guiding the support assembly (121) as it is translationally inserted therein;

wherein the internally threaded orifice (1121) of the first storage box (11) is threadably and detachably engageable with the externally threaded open top (1234) of the second storage box (12).

2. The swimming pool water treatment chemical dispenser of claim 1, wherein the flotation assembly (111) is made of expandable polystyrene foam.

3. The swimming pool water treatment chemical dispenser of claim 1, wherein the flotation assembly (111) is made of ethylene-vinyl acetate copolymer foam.

4. The swimming pool water treatment chemical dispenser of claim 1, wherein the flotation assembly (111) is made of polyethylene foam.

5. The swimming pool water treatment chemical dispenser of claim 1, further comprising a medicament including a sanitizer or disinfectant.

6. The swimming pool water treatment chemical dispenser of claim 1, further comprising a medicament including an algaecide.

7. The swimming pool water treatment chemical dispenser of claim 1, further comprising a medicament including a material capable of adjusting the pH of the swimming pool water.

8. The swimming pool water treatment chemical dispenser of claim 1, further comprising a medicament including a clarifier.

9. The swimming pool water treatment chemical dispenser of claim 1, wherein, the outer housing (122) is provided with a gear hole (1222) and a plurality of gear identifications (1223).

10. The swimming pool water treatment chemical dispenser of claim 1, wherein, the plurality of gear identifications (1223) are arranged on a side of the gear hole (1222).

11. The swimming pool water treatment chemical dispenser of claim 9, wherein, the inner housing (123) is provided with an indicator block (1235) which can slide along the gear hole (1222).

12. The swimming pool water treatment chemical dispenser of claim 11, wherein, the outer housing (122) is rotatable relative to the inner housing (123) to fluidically expose a plurality of through-holes (1231) of the inner housing (123) to a plurality of openings (1221) on the outer housing (122), while the indicator block (1235) slides along the gear hole (1222) to indicate a number of the plurality of through-holes (1231) that are fluidically exposed to the plurality of openings (1221).

* * * * *